United States Patent
Marzec et al.

(10) Patent No.: US 11,507,495 B2
(45) Date of Patent: Nov. 22, 2022

(54) SYSTEM AND METHOD FOR TEST IMPACT ANALYSIS OF COMPUTER PROGRAMS

(71) Applicant: PARASOFT CORPORATION, Monrovia, CA (US)

(72) Inventors: Jacek Marzec, Cracow (PL); Nathan Michael Jakubiak, Pasadena, CA (US)

(73) Assignee: PARASOFT CORPORATION, Monrovia, CA (US)

( * ) Notice: Subject to any disclaimer, the term of this patent is extended or adjusted under 35 U.S.C. 154(b) by 42 days.

(21) Appl. No.: 17/338,376

(22) Filed: Jun. 3, 2021

(65) Prior Publication Data

US 2021/0390036 A1    Dec. 16, 2021

Related U.S. Application Data

(60) Provisional application No. 63/038,297, filed on Jun. 12, 2020.

(51) Int. Cl.
*G06F 11/36* (2006.01)
*G06F 11/10* (2006.01)

(52) U.S. Cl.
CPC ...... *G06F 11/3676* (2013.01); *G06F 11/1004* (2013.01); *G06F 11/3684* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 8,824,373 | B2 * | 9/2014 | Seo | H04W 52/241 370/328 |
| 10,545,855 | B1 * | 1/2020 | Jayaswal | G06F 11/3608 |
| 2003/0046613 | A1 * | 3/2003 | Farchi | G06F 11/3676 714/38.1 |
| 2008/0172651 | A1 * | 7/2008 | Davia | G06F 11/3676 717/124 |
| 2010/0114638 | A1 * | 5/2010 | Bugayenko | G06Q 10/06395 705/7.41 |

OTHER PUBLICATIONS

Zheng, "An Initial Study of a Lightweight Process for Change Identification and Regression Test Selection When Source Code is Not Available", 2005, IEEE (Year: 2005).*

* cited by examiner

*Primary Examiner* — Hossain M Morshed
(74) *Attorney, Agent, or Firm* — Lewis Roca Rothgerber Christie LLP (57) ABSTRACT

System and method for testing changes to binary code of a computer program include: collecting test coverage data from an executed set of tests of an original computer program; calculating a baseline report containing correlations between the executed set of tests and blocks of binary code of the original computer program; determining binary code changes between the original computer program and a modified version of the computer program; identifying one or more tests to be executed for verifying the binary code changes.

20 Claims, 7 Drawing Sheets

SYSTEM AND METHOD FOR TEST IMPACT ANALYSIS OF COMPUTER PROGRAMS

CROSS-REFERENCE TO RELATED APPLICATIONS

This patent application claims the benefits of U.S. Provisional Patent Application Ser. No. 63/038,297, filed on Jun. 12, 2020, and entitled "System and Method for Impact Analysis of Computer Programs," the entire content of which is hereby expressly incorporated by reference.

FIELD OF THE INVENTION

The disclosure relates generally to software testing; and more particularly to a system and method for impact analysis of computer programs.

BACKGROUND

During software application development, organizations often create a suite of regression tests to verify that the functionality of the application continues to work as expected as they continue development. When the regression test suite gets large, these organizations have many tests to run to verify the quality of the software application. Moreover, the entire test suite may take a long time to execute, especially when testing a web user interface (UI) using known Selenium™ framework, or representational state transfer (REST) application programming interface (API) using web application testing programs, for example, Parasoft SOAtest™, etc. In such cases, developers, quality assurance (QA) or information technology (IT) integrators are not able to obtain quick feedback about the impact of changes to the application by running all tests. Obtaining quick feedback is especially important for continuous deployment of applications in which software functionalities are delivered frequently through automated deployments.

There are existing approaches that attempt to solve this problem by identifying a subset of tests to run based on analyzing changes made to the source code of the application and correlating those changes with previously collected data about which tests executed which lines of code. These approaches require having access to source code controlled by a version control system such as, Git™ or Subversion™. However, QA or IT integrators who execute the tests may have limited or no access to the source code of the application under test.

In many cases, QA or IT integrators have access only to the application's binary files (object code) delivered by development teams. Conventionally, the only way to verify changes to the object code of an application in these cases is to execute the entire set of tests manually or by an automated test executor, even if the changes affect only a small portion of the application.

SUMMARY

In some embodiments, the disclosure is directed to a method for testing changes to binary code of a computer program. The method includes: collecting test coverage data from an executed set of tests of an original computer program; calculating a baseline report containing correlations between the executed set of tests and blocks of binary code of the original computer program; determining binary code changes between the original computer program and a modified version of the computer program; identifying one or more tests to be executed for verifying the binary code changes.

In some embodiments, the disclosure is directed to a system for testing changes to binary code of a computer program. The system includes a coverage collector for collecting test coverage data from an executed set of tests of an original computer program; and a test impact analysis engine for calculating a baseline report containing correlations between the executed set of tests and blocks of binary code of the original computer program, determining binary code changes between the original computer program and a modified version of the computer program, and identifying one or more tests to be executed for verifying the binary code changes.

In some embodiments, the disclosure is directed to a tangible computer readable memory storing a plurality of computer instructions, the instruction when executed by one or more processor perform a method for testing changes to binary code of a computer program. The method includes: collecting test coverage data from an executed set of tests of an original computer program; calculating a baseline report containing correlations between the executed set of tests and blocks of binary code of the original computer program; determining binary code changes between the original computer program and a modified version of the computer program; and identifying one or more tests to be executed for verifying the binary code changes.

In some embodiments, a test executor executes the identified one or more tests to verify the binary code changes. The executed set of tests may include a plurality of sub-tests and the baseline report includes coverage data that identifies which subtest covers which block of binary code in the original computer program.

In some embodiments, calculating a baseline report may include scanning the original computer program; computing a fingerprint for each block of binary code of the original computer program; and determining binary code changes between the original computer program and a modified version of the computer program utilizing the fingerprints for blocks of binary code. The blocks of binary code may be defined by line numbers that correspond to the binary code, or by a name of a class or method to which the binary code belongs.

BRIEF DESCRIPTION OF THE DRAWINGS

A more complete appreciation of the disclosure, and many of the attendant features and aspects thereof, will become more readily apparent as the disclosure becomes better understood by reference to the following detailed description when considered in conjunction with the accompanying drawings in which like reference symbols indicate like components.

DETAILED DESCRIPTION

In some embodiments, the system and method of the disclosure solve these problems by identifying a subset of tests that execute against (binary files of) an application, without having access to the application's source code. In some embodiments, the disclosed system and method identify the tests impacted by the changes between two versions of the same application. The process, executed by one or more computers, collects the coverage data from a fully executed test run against the first version of the application binaries. Based on that coverage data, the disclosure produces a baseline report that contains correlations between executed tests and blocks of code for the application. Provided with a second (modified) version of the application binaries and the baseline report, the disclosure determines code changes between the two versions of the application, and using that information it can identify tests that need to be run to validate those changes. After that, it is sufficient to execute only the impacted tests to validate changes made to the application.

Figure 1:
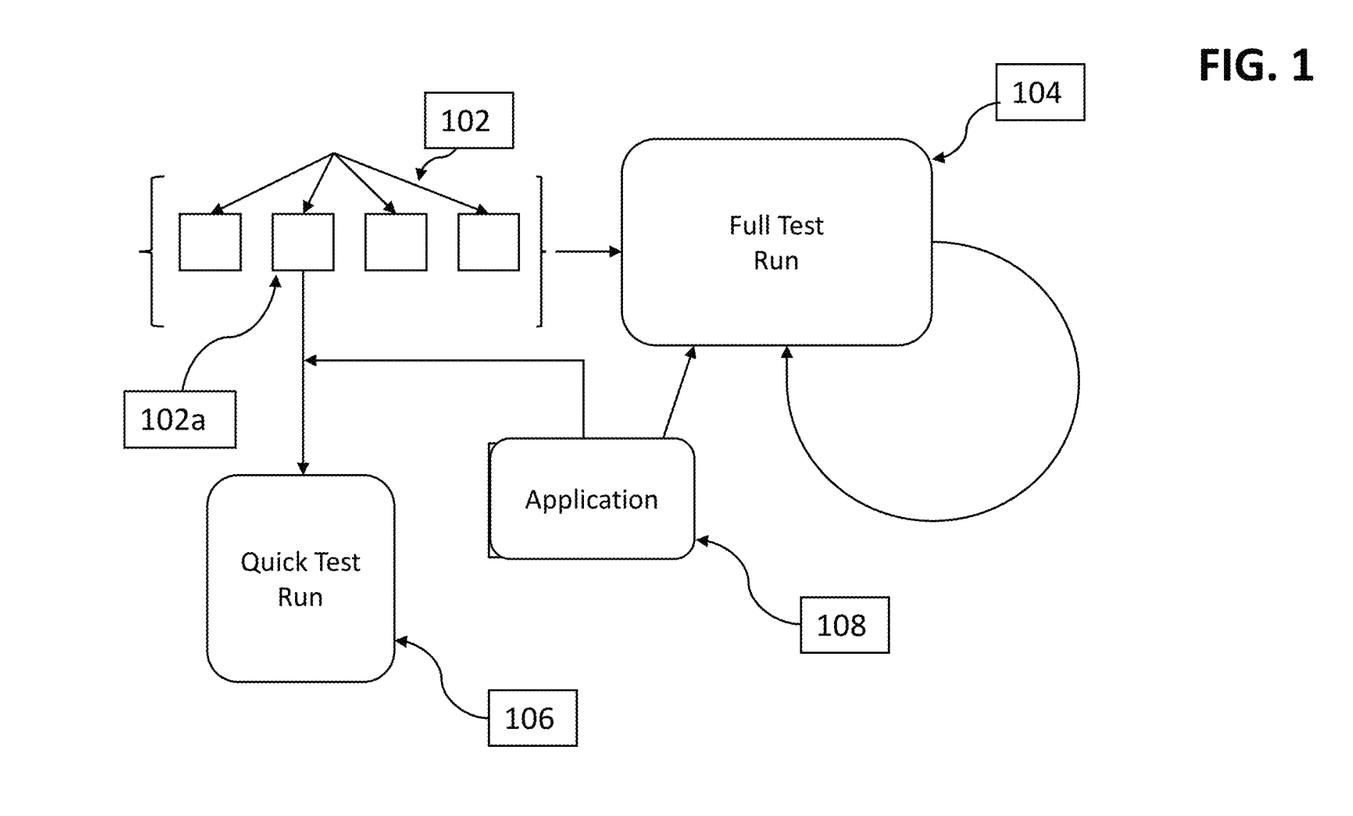
FIG. 1 shows an exemplary test environment, according to some embodiments of the disclosure.

FIG. 1 shows an exemplary test environment, according to some embodiments of the disclosure. As shown, a full test run 104, executed by one or more computers, executes the entire set of tests (subtests) 102 for an application 108 and collects data for finding impacted tests. In some embodiments, the full test run 104 is executed periodically, for example once per night or once per week. Each time changes are made to the application 108 and a new build of the application is made, a quick test run 106, executed by one or more computers, uses the collected data and runs only a subset of the entire set of tests 102a to get quick feedback about the quality of the changes.

Figure 2:
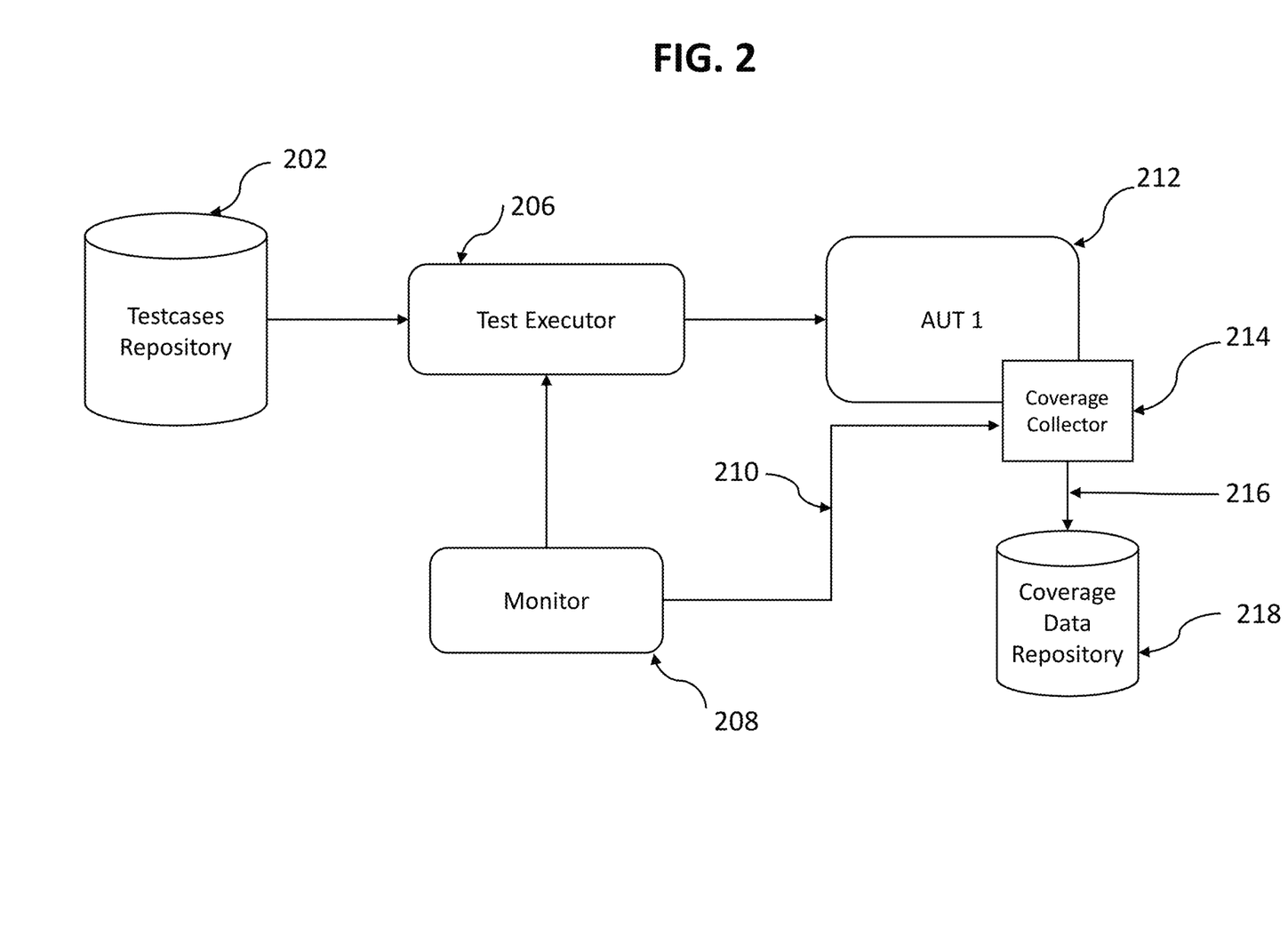
FIG. 2 is an exemplary block diagram for collecting coverage data, according to some embodiments of the disclosure.

FIG. 2 is an exemplary block diagram for collecting coverage data, according to some embodiments of the disclosure. As shown, the process of the disclosure, executed by one or more computers, collects coverage data that identifies which tests cover which blocks of binary code in a tested application 212. Test cases from a test repository 202 are executed by a test executor 206 against the first version of the application (AUT 1). A monitor 208 observes the test execution performed by the test executor, e.g., Parasoft SOAtest™, JUnit™ or TestNG™ frameworks. Monitor is notified by the test executor 206, when a test starts or stops and then dispatches an event 210 to a coverage collector 214. In turn, the coverage collector 214 monitors which blocks of code of the application 212 were executed and makes associations between those blocks and the test currently being executed. The collected data 216 is then stored in a coverage data repository 218. The stored data is then used to produce the baseline report for the application.

To collect the coverage data, a user may attach a test coverage collector to the application and then execute all tests manually or using an automated test executor, such as known Selenic™ or SOAtest™ test programs by Parasoft™ Inc. As the tests run, they are monitored by the monitor 208 (e.g. provided by Selenic™, SOAtest™, etc.), which observes individual test case execution. In SOAtest™ the monitor is built-in to the product. For example, for Selenium™ tests, monitor 208 is a Java agent that gets attached to the test execution process to monitor the JUnit™ or TestNG™ test frameworks for identifying test start and stop events and the names of individual tests that are executed. Monitor 208 then notifies the coverage collector 214 when each test case starts and stops and when the entire session ends (210). Coverage collector 214 stores the collected coverage data in the coverage data repository 218 (e.g., a local file storage or other known storage schemes), to be used in further processes.

Figure 3:
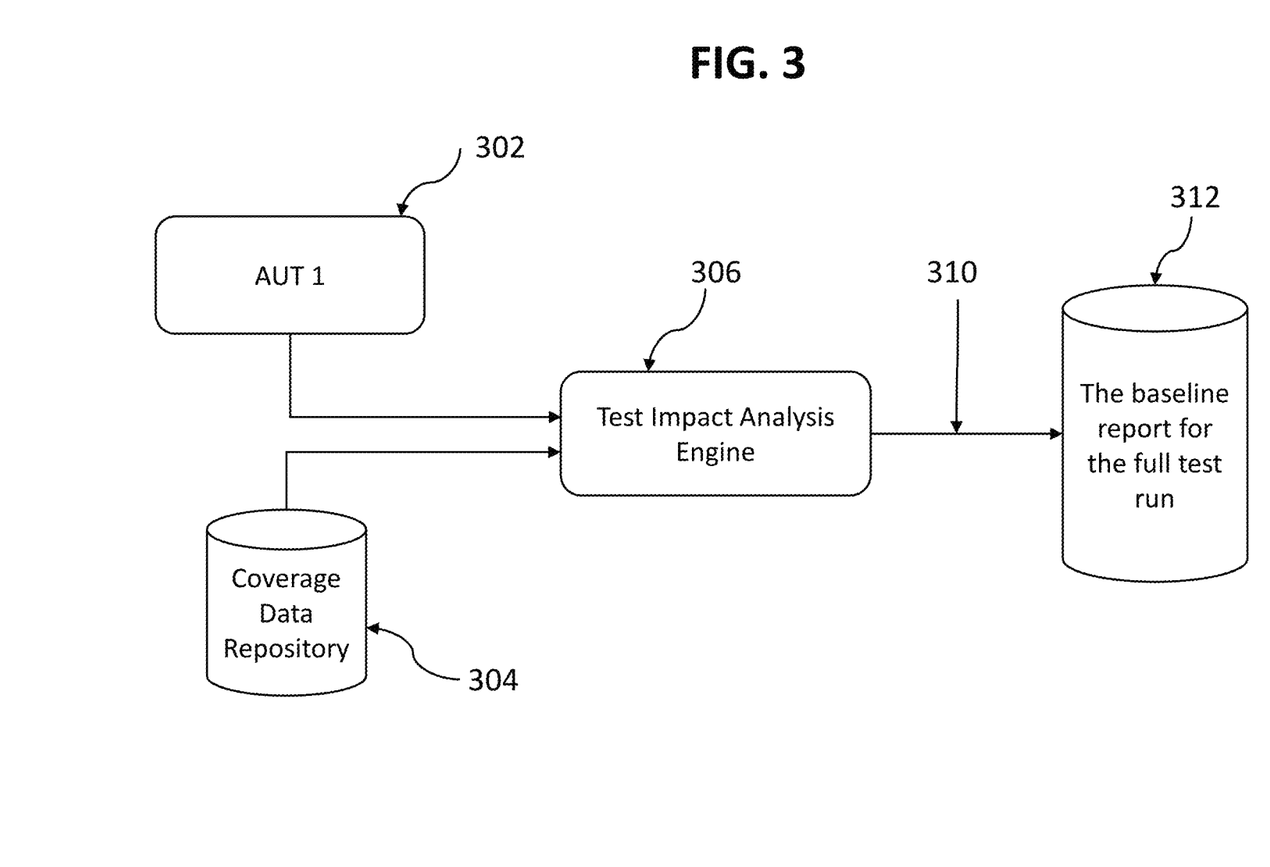
FIG. 3 illustrates an exemplary process for calculating a baseline report, according to some embodiments of the disclosure.

FIG. 3 illustrates an exemplary process, executed by one or more computers, for calculating a baseline report, according to some embodiments of the disclosure. As depicted, for a first version of the application under test 302 (AUT 1), a test impact analysis engine 306 generates a baseline report 312 which contains fingerprints and/or correlations 310 between executed tests and blocks of code in the application 302 executed by each test. In some embodiments, the test impact analysis engine 306 scans the AUT 1 to compute fingerprints for blocks of code.

In some embodiments, the test impact analysis engine 306 uses the files that make up a first version of the application and coverage data stored in a data repository 304 collected from a full test run described above, as its inputs. The application 302 may be organized as an archive or a directory of files. For instance, for a Java Web Application™, the test impact analysis engine 306 may process a "WAR" file or an installation directory that contains "jar" files. The test impact analysis engine scans each file in the application, recursively iterating into archive files such as jar and zip files which may contain "class files" for Java™ applications. In some embodiments, the analysis is limited to those files known to have been covered during the full test execution. In some embodiments, some filtering is performed by scanning the coverage data repository and skipping files that were not covered during the full test run.

Each file in the application 302 contains code or compiled binary (object) code. In some embodiments, the files in both cases can be broken up into code blocks in different ways. For example, one way to define a code block is by the name of the file or the class to which the code belongs. Another way to define a code block is by the file or class name and the line number that corresponds to the code (which can be present in the compiled binary code). Another possible way to define a code block is by the name of the class and the name of the method to which the code belongs.

For each file in the application 302, the test impact analysis engine 306 computes fingerprints of the one or more code blocks in that file that will be used later in the process to detect changes to those code blocks. In some embodiments, the fingerprint may be a checksum calculated as a 32-bit Cyclic Redundancy Check (CRC32) from the data stream of the code block contents (binary code). Other fingerprinting algorithms like MD5 or SHA could also be used.

In some embodiments, the test impact analysis engine 306 computes a pseudo unique identifier for each code block in the application 302, that can be used in later processes to identify the code block even if its location within the application changed in a newer version of the application. There are different ways that such an identifier can be computed. For example, when the code block is an entire Java™ class file, the fully qualified class name for the class represented by that file can be used as the identifier. When the code block is a method or line number in a file, the file name along with the method signature or line number could be used as an identifier for the code block.

As a result, the test impact analysis engine 306 produces a baseline report 312 with fingerprints and pseudo unique identifiers for each code block within the first version of the application, as well as correlations that specify which tests executed which blocks of code. The tests are referenced by a test identifier that can be used to identify the test. For example, the test identifier for a JUnit™ or TestNG™ test may be the fully qualified class name and method name of the test. The test identifier for a Parasoft SOAtest™ test may be an identifier constructed by the Parasoft SOAtest™ application. In addition, the report may contain the relative locations for each of the files and code blocks within the application structure. In some embodiments, the report may be stored in a local file in XML format.

Figure 4A:
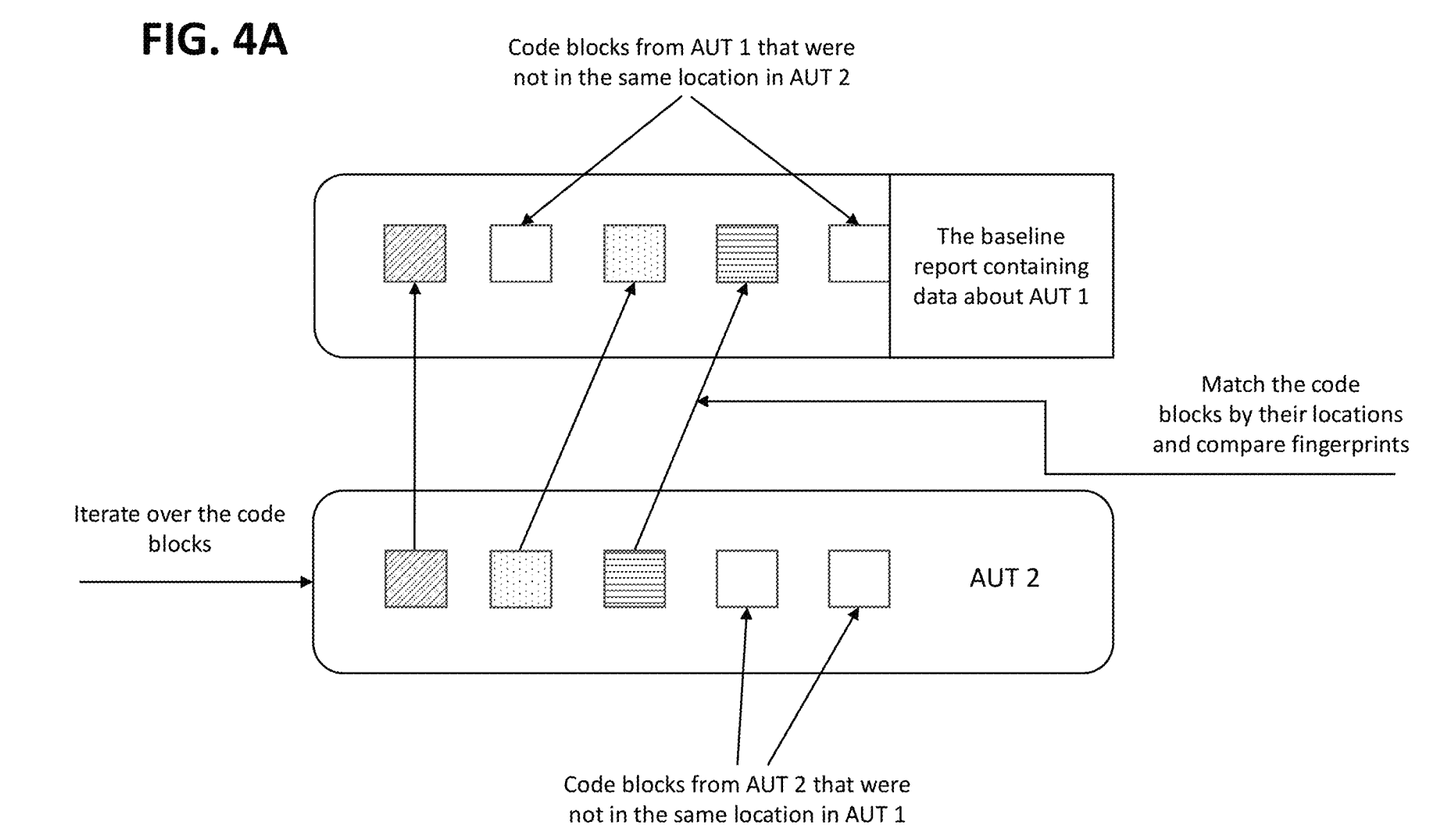
FIGS. 4A and 4B illustrate an exemplary process for identifying changed code blocks in an application, according to some embodiments of the disclosure.
Figure 4B:
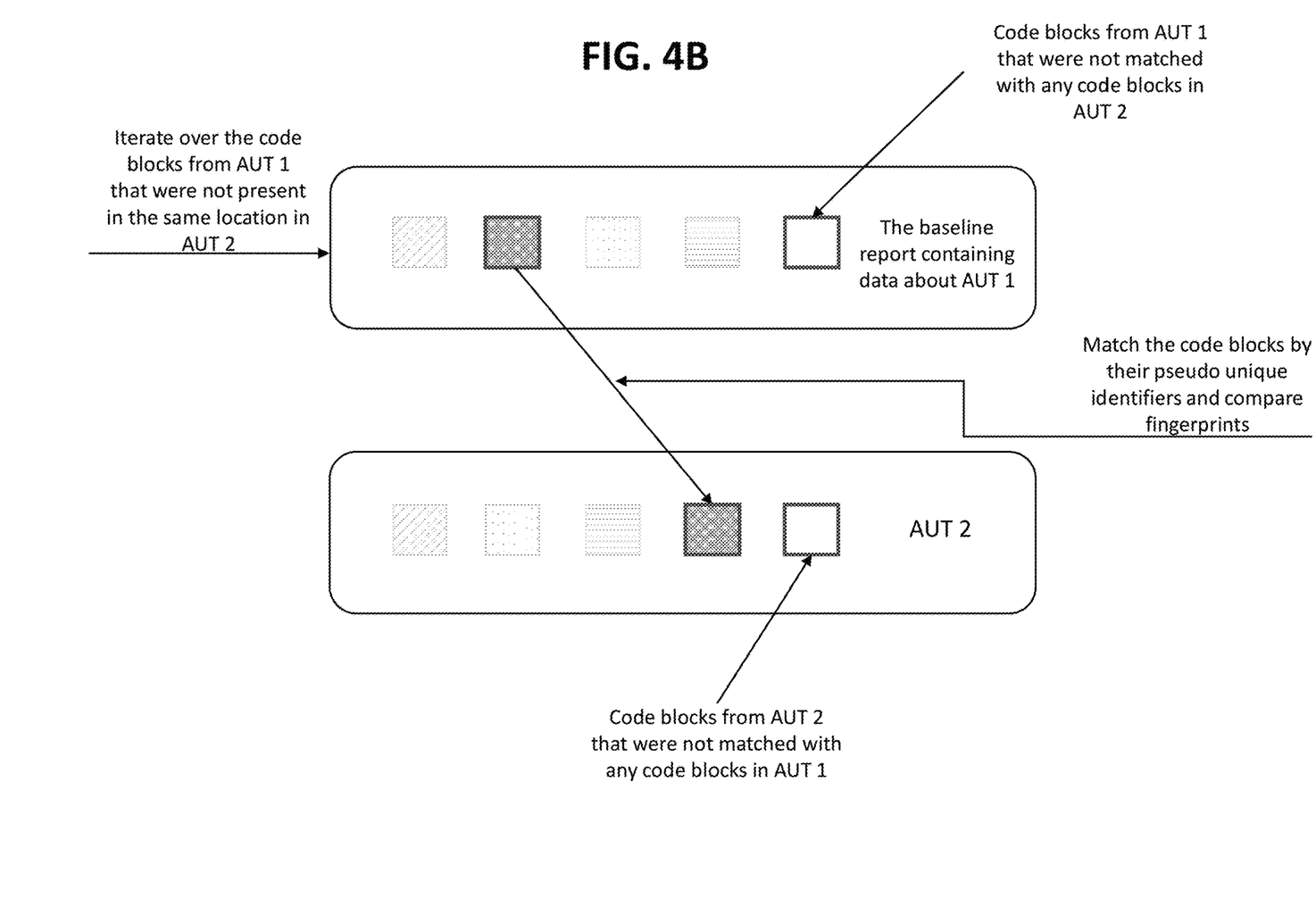

FIGS. 4A and 4B illustrate an exemplary process for identifying changed code blocks according to some embodiments of the disclosure. As shown in FIG. 4A, a test impact analysis engine scans an updated version of the application under test (AUT 2) and computes fingerprints for each code block contained within the second version of the application binaries. Next, it identifies the code blocks that were modified after the first version of the application (AUT 1) was generated, by iterating over each code block in AUT 2 and checking whether the code block exists in the same location in the application binaries for both AUT 1 and AUT 2. For each code block that exists in the same locations in AUT 1 and AUT 2, the test impact analysis engine compares the fingerprint for the code block that was stored in the baseline report with the fingerprint it calculated for the code block in AUT 2, marking the code block as modified when the fingerprints are different. For example, in FIG. 4A, three code blocks were found to be in the same locations in both AUT 1 and AUT 2. Additionally, FIG. 4A illustrates that AUT 1 contained two code blocks that were not in the same location in AUT 2, and that AUT 2 contained two code blocks that were not in the same location in AUT 1.

In some embodiments, the test impact analysis engine attempts to match code blocks that may have moved from one location in AUT 1 to a different location in AUT 2, as shown in FIG. 4B. For all code blocks that do not exist in the same locations in the application binaries for AUT 1 and AUT 2, the test impact analysis engine matches code blocks that have the same pseudo unique identifier. For each pair of matched code blocks, the test impact analysis engine compares the fingerprint for the code block that was stored in the baseline report with the fingerprint that was calculated for the code block in AUT 2. The test impact analysis engine then marks the code block as modified when the fingerprints are different. This process handles the case where code is moved from one location to another within the application. In the example shown in FIG. 4B, only one code block was found to have moved within the application.

The remaining code blocks from AUT 1 that were not matched in the two previous processes are then marked as modified, since they are not present in AUT 2. This process handles the case where code that was present in AUT 1 has been deleted from the application. In the example shown in FIG. 4B, only one code block was found to have been removed, that is, the code block that was present in AUT 1 but not present in AUT 2. FIG. 4B also shows that one code block was found to have been added, that is, the code block that was present in AUT 2 but was not present in AUT 1. The added code block in AUT 2 is ignored because the baseline report contains no correlations between tests and that code, since that code was not previously present in AUT 1.

In some embodiments, code blocks may be defined differently for the purpose of creating fingerprints than they are defined for the purpose of creating correlations between executed tests and code. For example, for creating finger-prints, a code block can be defined as an entire file and a fingerprint can be created for the content of the entire file. However, for creating correlations between executed tests and code, a code block can be defined as a method or line in a specific class. In this latter case, a single file may contain multiple smaller code blocks used to correlate tests and code. When a change in the file is detected, the test impact analysis engine marks all smaller code blocks within that file as having been changed.

Figure 5:
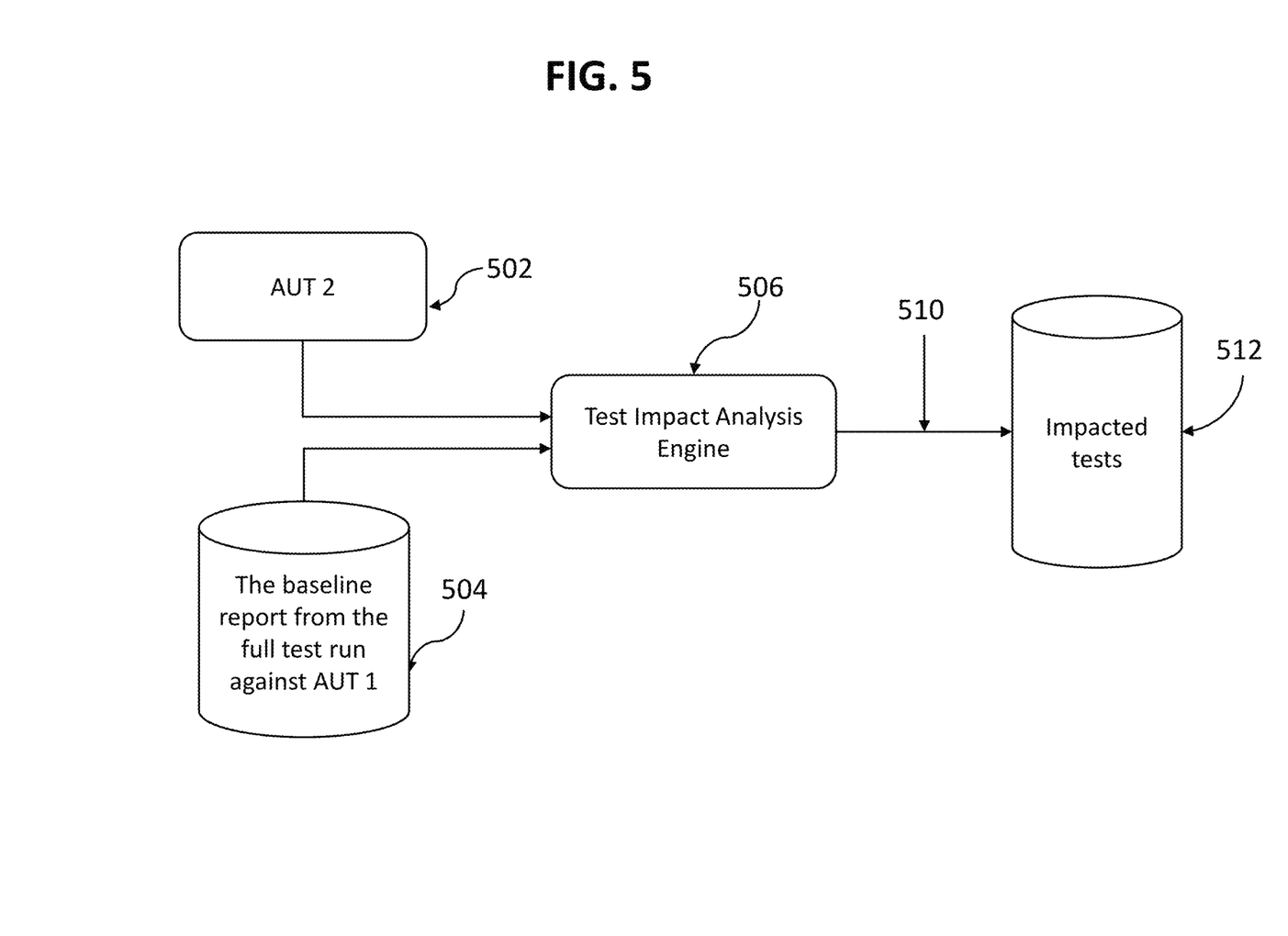
FIG. 5 shows an exemplary block diagram and corresponding process for identifying impacted tests, according to some embodiments of the disclosure.

FIG. 5 shows an exemplary block diagram and corresponding process for identifying impacted tests, according to some embodiments of the disclosure. As illustrated, the application AUT 2 (502) and the baseline report 504 are used as inputs for the test impact analysis engine 506 to identify the code blocks modified between AUT 1 and AUT 2 following the process described above. Next, the test impact analysis engine identifies the tests that cover each modified code block, using the correlation data between tests and code blocks contained in the baseline report 504. The test impact analysis engine 506 then outputs a list of impacted tests 510, which can be executed to confirm that no regressions were introduced by the changes to the application. The list of impacted tests 510 is then stored in a database 512.

In some embodiments, instructions for the processes of the present disclosure may be stored on a tangible computer storage medium, such as RAM, ROM, NVM, CDs, and the like, read and executed by one or more processors to perform the processes.

Figure 6:
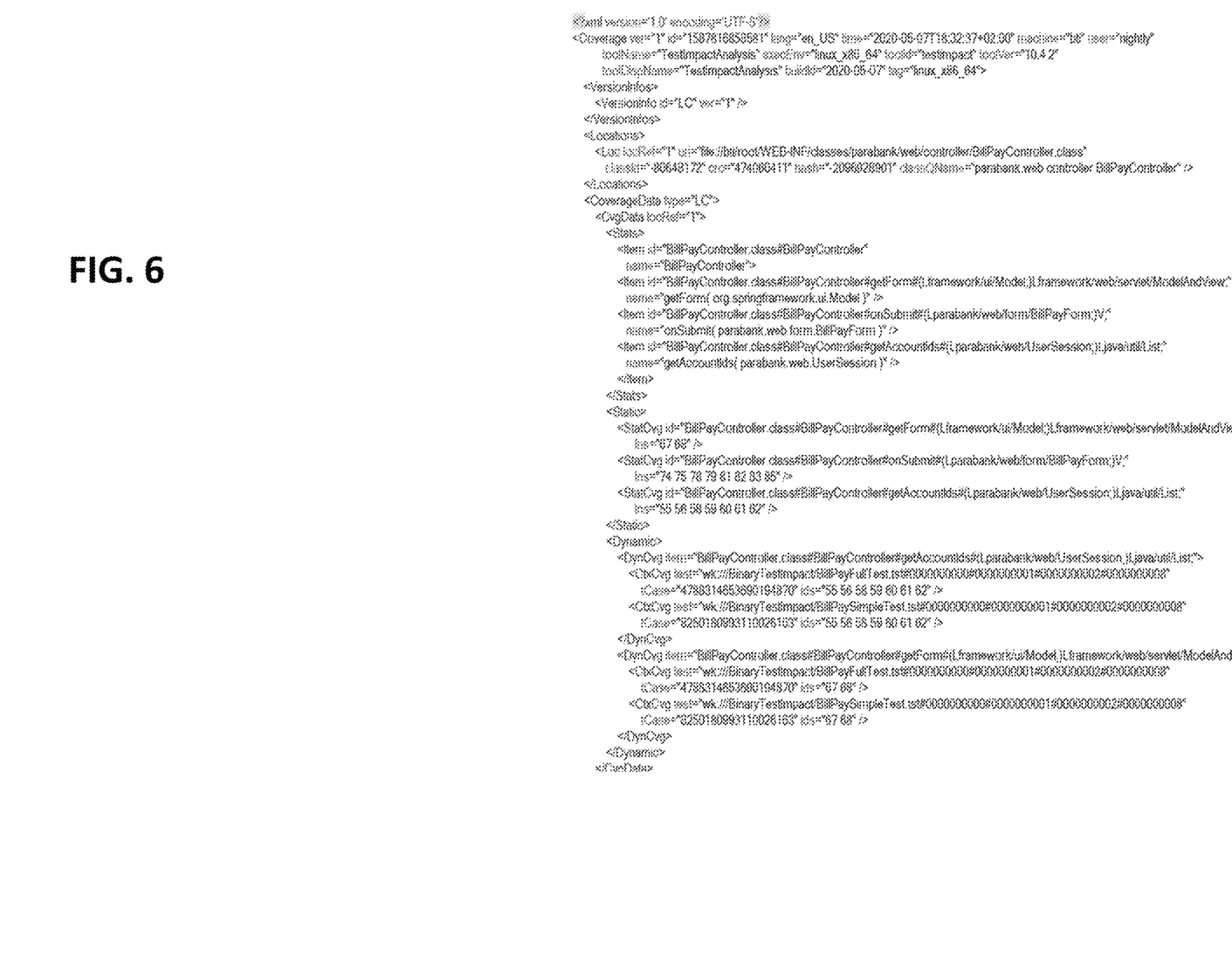
FIG. 6 is an example of a baseline report, according to some embodiments of the disclosure.

FIG. 6 is an example of a baseline report, according to some embodiments of the disclosure. The report contains fingerprints for each of the application's files along with correlations between executed tests and blocks of code (in this case defined as a class and line number) for the first version of the application. The report consists of two main parts that are important for the test impact analysis process. The first section <Locations> lists all recognized files along with their relative paths within the application structure (see the cuff attribute for each "Loc" element). The fingerprint ('crc' attribute) and unique identifier ('classQName') is stored for each file.

The second section <CoverageData> stores information about which test cases cover which code blocks for each file. The coverage data is organized first by file (see the "Cvg-Data" element where the 'locRef' attribute value matches a "Loc" element that has the same value in its 'locRef' attribute). Next it is organized by the methods in that file (see the 'item' attribute in the "DynCvg" element). For each method, there is a "CtxCvg" element that contains a test identifier for each test that executed code in that method (see the 'test' attribute) and the line numbers of the code that was executed by that specific test (see the 'ids' attribute).

In some embodiments, the test impact analysis engine can be integrated with other testing programs to automate processes that execute a minimal set of tests needed to verify application changes, for example, functional tests. In some embodiments, the test impact analysis engine may be used to identify manual tests that need to be re-run based on changes between two versions of an application under test.

In some embodiments, the invention uses fingerprints to identify which files have changed between two different versions of an application, along with a test execution monitor that interacts with a coverage collection engine to identify correlations about which tests execute which blocks of code within the application, to produce a report that shows what tests need to be run to verify the application changes.

It will be recognized by those skilled in the art that various modifications may be made to the illustrated and other embodiments of the disclosure described above, without departing from the broad inventive scope thereof. It will be understood therefore that the disclosure is not limited to the particular embodiments or arrangements disclosed, but is rather intended to cover any changes, adaptations or modifications which are within the scope and spirit of the disclosure as defined by the appended claims and drawings.

What is claimed is:

1. A method for testing changes to binary code of a computer program, the method comprising:
collecting test coverage data from an executed set of tests of an original computer program;
creating baseline report containing correlations between the executed set of tests and blocks of binary code of the original computer program;
determining binary code changes between the original computer program and a modified version of the computer program; and
identifying one or more tests to be executed for verifying the binary code changes, wherein determining binary code changes comprises:
iterating over each block of binary code of the modified version of the computer program and checking whether said each block of binary code exists in same location in the binary codes of the original computer program and the modified version of the computer program,
for each block of binary code that exists in the same locations, comparing a fingerprint for the block of binary code in the baseline report with a fingerprint for the block of binary code in the modified version of the computer program, and
marking the code block as modified when the fingerprints are different,
for all blocks of binary code that do not exist in same locations in the binary codes of the original computer program and the modified version of the computer program, matching blocks of binary codes that have a same pseudo unique identifier,
for each pair of matched blocks of binary code, comparing the fingerprint for the block of binary code in the baseline report with the fingerprint for the block of binary code in the modified version,
marking the block of binary code as modified when the fingerprints are different, and
marking remaining binary codes of the original computer program that were not matched as modified.

2. The method of claim 1, further comprising executing the identified one or more tests to verify the binary code changes.

3. The method of claim 1, wherein the executed set of tests comprises a plurality of sub-tests and the baseline report includes coverage data that identifies which subtest covers which block of binary code in the original computer program.

4. The method of claim 1, wherein creating a baseline report comprises scanning the original computer program; computing a fingerprint for each block of binary code of the original computer program; and determining binary code changes between the original computer program and the modified version of the computer program utilizing the fingerprints for blocks of binary code.

5. The method of claim 1, wherein the blocks of binary code are defined by line numbers that correspond to the binary code.

6. The method of claim 1, wherein the blocks of binary code are defined by a name of a class or method to which the binary code belongs.

7. The method of claim 4, wherein the blocks of binary code are defined as an entire file and the fingerprint is created for the content of the entire file.

8. The method of claim 4, wherein the fingerprint is a checksum calculated as a Cyclic Redundancy Check from data stream of the binary code.

9. The method of claim 1, further comprising storing the baseline report in an XML format.

10. The method of claim 1, wherein identifying one or more tests comprises identifying binary code blocks that were modified in the modified version; comparing the fingerprints of each binary code block in the modified program with fingerprints for blocks of binary code of the original computer program in the baseline report; determining one or more modified binary code blocks; and utilizing the modified binary code blocks to determine corresponding one or more tests that can be run to verify the binary code changes.

11. The method of claim 10, further comprising marking a binary code block as modified when its fingerprint is different than a corresponding block of binary code of the original computer program.

12. A system for testing changes to binary code of a computer program comprising:
a coverage collector for collecting test coverage data from an executed set of tests of an original computer program; and
a test impact analysis engine for creating baseline report containing correlations between the executed set of tests and blocks of binary code of the original computer program, determining binary code changes between the original computer program and a modified version of the computer program, and identifying one or more tests to be executed for verifying the binary code changes, wherein determining binary code changes comprises:
iterating over each block of binary code of the modified version of the computer program and checking whether said each block of binary code exists in same location in the binary codes of the original computer program and the modified version of the computer program,
for each block of binary code that exists in the same locations, comparing a fingerprint for the block of binary code in the baseline report with a fingerprint for the block of binary code in the modified version of the computer program, and
marking the code block as modified when the fingerprints are different,
for all blocks of binary code that do not exist in same locations in the binary codes of the original computer program and the modified version of the computer program, matching blocks of binary codes that have a same pseudo unique identifier,
for each pair of matched blocks of binary code, comparing the fingerprint for the block of binary code in the baseline report with the fingerprint for the block of binary code in the modified version,
marking the block of binary code as modified when the fingerprints are different, and marking remaining binary codes of the original computer program that were not matched as modified.

13. The system of claim 12, further comprising a test executor for executing the identified one or more tests to verify the binary code changes.

14. The system of claim 12, wherein the executed set of tests comprises a plurality of sub-tests and the baseline report includes coverage data that identifies which subtest covers which block of binary code in the original computer program.

15. The system of claim 12, wherein creating a baseline report comprises scanning the original computer program; computing a fingerprint for each block of binary code of the original computer program; and determining binary code changes between the original computer program and the modified version of the computer program utilizing the fingerprints for blocks of binary code.

16. The system of claim 12, wherein the blocks of binary code are defined by line numbers that correspond to the binary code.

17. The system of claim 12, wherein the blocks of binary code are defined by a name of a class or method to which the binary code belongs.

18. The system of claim 15, wherein the fingerprint is a checksum calculated as a Cyclic Redundancy Check from data stream of the binary code.

19. A non-transitory tangible computer readable memory storing a plurality of computer instructions, the instructions when executed by one or more processor perform a method for testing changes to binary code of a computer program, the method comprising:

collecting test coverage data from an executed set of tests of an original computer program; creating a baseline report containing correlations between the executed set of tests and blocks of binary code of the original computer program;

determining binary code changes between the original computer program and a modified version of the computer program; and identifying one or more tests to be executed for verifying the binary code changes, wherein determining binary code changes comprises:

iterating over each block of binary code of the modified version of the computer program and checking whether said each block of binary code exists in same location in the binary codes of the original computer program and the modified version of the computer program, for each block of binary code that exists in the same locations, comparing a fingerprint for the block of binary code in the baseline report with a fingerprint for the block of binary code in the modified version of the computer program, and marking the code block as modified when the fingerprints are different, for all blocks of binary code that do not exist in same locations in the binary codes of the original computer program and the modified version of the computer program, matching blocks of binary codes that have a same pseudo unique identifier, for each pair of matched blocks of binary code, comparing the fingerprint for the block of binary code in the baseline report with the fingerprint for the block of binary code in the modified version, marking the block of binary code as modified when the fingerprints are different, and marking remaining binary codes of the original computer program that were not matched as modified.

20. The non-transitory tangible computer readable memory of claim 19, further comprising instructions for executing the identified one or more tests to verify the binary code changes.

* * * * *

UNITED STATES PATENT AND TRADEMARK OFFICE
CERTIFICATE OF CORRECTION

PATENT NO. : 11,507,495 B2
APPLICATION NO. : 17/338376
DATED : November 22, 2022
INVENTOR(S) : Jacek Marzec et al.

It is certified that error appears in the above-identified patent and that said Letters Patent is hereby corrected as shown below:

In the Claims

Column 7, Line 16, Claim 1     After "creating" insert -- a --

Column 8, Line 31, Claim 12    After "creating" insert -- a --

Signed and Sealed this
Eighteenth Day of July, 2023

Katherine Kelly Vidal
*Director of the United States Patent and Trademark Office*